United States Patent
Tamaoki et al.

(10) Patent No.: US 8,705,912 B2
(45) Date of Patent: Apr. 22, 2014

(54) LIGHT SOURCE APPARATUS AND PROCESSING METHOD

(75) Inventors: Shinobu Tamaoki, Yokohama (JP); Motoki Kakui, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 13/485,517

(22) Filed: May 31, 2012

(65) Prior Publication Data

US 2012/0305806 A1    Dec. 6, 2012

Related U.S. Application Data

(60) Provisional application No. 61/493,242, filed on Jun. 3, 2011.

(30) Foreign Application Priority Data

Jun. 3, 2011  (JP) ................................. P2011-125218

(51) Int. Cl.
*G02B 6/26* (2006.01)
*G02B 6/32* (2006.01)

(52) U.S. Cl.
USPC ............................................ 385/27; 385/125

(58) Field of Classification Search
USPC ................................................... 385/27, 125
See application file for complete search history.

(56) References Cited

U.S. PATENT DOCUMENTS

| | | | |
|---|---|---|---|
| 7,768,700 B1 * | 8/2010 | Savage-Leuchs | 359/341.1 |
| 2006/0027544 A1 | 2/2006 | Pailthorp et al. | |

FOREIGN PATENT DOCUMENTS

| | | |
|---|---|---|
| JP | 2008-509006 | 3/2008 |
| JP | 2008-262199 | 10/2008 |
| JP | 2011-023408 | 2/2011 |
| JP | 2011-513768 | 4/2011 |
| WO | WO-2008/108269 A1 | 9/2008 |

OTHER PUBLICATIONS

International Preliminary Report on Patentability and Written Opinion in PCT International Application No. PCT/JP2012/064193, dated Dec. 19, 2013.

* cited by examiner

*Primary Examiner* — Omar Rojas
(74) *Attorney, Agent, or Firm* — Venable LLP; Michael A. Sartori; F. Brock Riggs

(57) ABSTRACT

The present invention relates to a light source apparatus. The light source apparatus has an MOPA configuration and comprises a seed light source, a pulse generator, an intermediate optical amplifier, a final stage optical amplifier, a delivery optical fiber, and a light output terminal. The delivery optical fiber is a PBG fiber having a photonic bandgap (PBG) structure in a core-surrounding portion located around the core. Light with a wavelength in a high loss band of the PBG fiber is inputted into the PBG fiber.

13 Claims, 13 Drawing Sheets

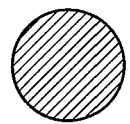 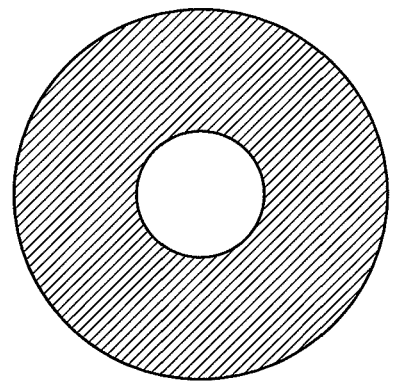
*Fig.7A*  *Fig.7B*

LIGHT SOURCE APPARATUS AND PROCESSING METHOD

CROSS-REFERENCE TO RELATED APPLICATION

This application is based upon and claims the benefit of priorities from U.S. Provisional Application No. 61/493242, filed on Jun. 3, 2011 and Japanese Patent Application No. 2011-125218, filed on Jun. 3, 2011, the entire contents of which are incorporated herein by reference.

BACKGROUND OF THE INVENTION

1. Field of the Invention

The present invention relates to a light source apparatus and a processing method.

2. Related Background Art

Light source apparatuses that output laser light have been used for various purposes such as processing and medical uses, and are generally required to have high power of output laser light and high beam quality. An optical fiber laser light source apparatus that has gained attention among light source apparatuses uses an amplifying optical fiber whose core is doped with various rare earth elements such as Yb, Er, and Tm as an amplifying medium.

In the optical fiber laser light source apparatus, by adopting an MOPA (Master Oscillator Power Amplifier) configuration, etc., that amplifies seed light outputted from a seed light source by an amplifying optical fiber, power of output laser light can be increased. In addition, the optical fiber laser light source apparatus amplifies light that propagates in the core of the amplifying optical fiber, so that the beam quality of the output laser light is high. Therefore, the optical fiber laser light source apparatus is preferably used for processing purposes, etc.

Generally, a light intensity distribution in a beam cross section of laser light outputted from the light source apparatus is desirably a Gaussian distribution or in a form close to a Gaussian distribution. As the light intensity distribution of the output laser light becomes closer to the Gaussian distribution, the beam quality of the output laser light becomes higher. As the beam quality of the output laser light becomes higher, the beam diameter of the laser light can be made smaller by a lens system, so that high-quality processing is possible.

SUMMARY OF THE INVENTION

The present inventors have examined the above prior art, and as a result, have discovered the following problems.

Namely, as described above, as the light intensity distribution of output laser light becomes closer to a Gaussian distribution, the beam diameter of the laser light can be made narrower by a lens system. In this case, high-quality processing is possible, however, the number of times of scanning of laser light irradiation on a target to be processed may increase and the irradiation time may become longer. For example, as described in Japanese Patent Application (Translation of PCT Application) Laid-Open No. 2008-509006 (Patent Document 1) listed above, conventionally, when processing of a ring shape is applied to a target to be processed, it is necessary to scan a laser light irradiation position along the ring.

If laser light with a ring-shaped light intensity distribution whose optical power is higher at the peripheral portion than at the center portion of a light beam cross section is realized, processing of a ring shape is easy. However, a device that easily realizes laser light with such a ring-shaped light intensity distribution has not been known.

The present invention has been developed to eliminate the problems described above. It is an object of the present invention to provide a light source apparatus that can easily obtain output light with a ring-shaped light intensity distribution whose optical power is higher at the peripheral portion than at the center portion of a light beam cross section.

As a first aspect, a light source apparatus according to the present invention comprises a first light source unit that outputs single-mode light with a main output wavelength $\lambda 1$, and a delivery optical fiber into which output light from the light source unit is inputted, after the output light is amplified. In the first aspect, the delivery optical fiber has a photonic bandgap structure in a core-surrounding portion located around the core, and has, in the core, a first wavelength band substantially constant at a first value and a second wavelength band having loss higher than the loss in the first wavelength band, as power transfer loss characteristics according to change in a longitudinal direction of an output light propagating region in the fiber section. The wavelength $\lambda 1$ exists in the second wavelength band. Further, the bending state of the delivery optical fiber is set so that the light with the wavelength $\lambda 1$ outputted from the delivery optical fiber becomes a ring-shaped light intensity distribution in the core-surrounding portion.

As a second aspect applicable to the first aspect, the light source apparatus according to the present invention may further comprise a second light source unit that outputs light with a main output wavelength $\lambda 2$. In the second aspect, the wavelength $\lambda 2$ exists in the first wavelength band. The light with the wavelength $\lambda 1$ and the light with the wavelength $\lambda 2$ are multiplexed, and the multiplexed light is inputted into the delivery optical fiber.

As a third aspect applicable to at least one of the first and second aspects, at least one of the length and the bending state of the delivery optical fiber may be set so that power transfer loss at the main output wavelength becomes a value 3 dB or more higher than the first value.

Alternatively, as a fourth aspect, a light source apparatus according to the present invention comprises a first light source unit that outputs single-mode light with a main output wavelength $\lambda 1$, and a delivery optical fiber into which output light from the first light source unit is inputted, after the output is amplified, the delivery optical fiber generating Raman scattered light with a wavelength $\lambda_R$ when the light with the wavelength $\lambda 1$ propagates therethrough. In the fourth aspect, the delivery optical fiber has a photonic bandgap structure at the core-surrounding portion located around the core, and has, in the core, a first wavelength band substantially constant at a first value and a second wavelength band with a loss higher than the loss in the first wavelength band, as power transfer loss characteristics according to change in a longitudinal direction of an output light propagating region in the fiber section. Light with the wavelength $\lambda_R$ exists in the second wavelength band. Further, the bending state of the delivery optical fiber is set so that the light with the wavelength $\lambda_R$ outputted from the delivery optical fiber becomes a ring-shaped light intensity distribution in the core-surrounding portion.

As a fifth aspect applicable to the fourth aspect, in the light source apparatus according to the present invention, at least one of the length or the bending state of the delivery optical fiber is set so that power transfer loss at the wavelength $\lambda_R$ becomes a value 3 dB or more higher than the first value.

As a sixth aspect applicable to at least any one of the first to fifth aspects, the first wavelength band may be located on the shorter wavelength side than the second wavelength band. On the contrary, as a seventh aspect applicable to at least any one of the first to fifth aspects, the first wavelength band may be located on the longer wavelength side than the second wavelength band. In both of the sixth and seventh aspects, a wavelength (hereinafter, referred to as a cut wavelength) that indicates a boundary between a short wavelength band and a long wavelength band is regulated as a wavelength at which power transfer loss characteristics have a loss of only 3 dB higher than the first value.

As an eighth aspect applicable to at least any one of or a combination of two or more aspects of the first to seventh aspects, a processing method according to the present invention is a method utilizing a light source apparatus according to the present invention described above. The processing method prepares the light source apparatus, and processes a target to be processed by irradiating the target to be processed with light that has a ring-shaped light intensity distribution and is outputted from an output terminal of the delivery optical fiber of the light source apparatus.

As a ninth aspect applicable to the eighth aspect, the delivery optical fiber may be set so that the intensity distribution of light outputted from the output terminal of the delivery optical fiber is not ring-shaped before the bending state of the delivery optical fiber is changed, and the intensity distribution of the light outputted from the output terminal of the delivery optical fiber becomes ring-shaped after the bending state of the delivery optical fiber is changed.

BRIEF DESCRIPTION OF THE DRAWINGS

FIG. 7A is a view showing an image of an input region of light inputted into the PBGF shown in FIG. 6, and FIG. 7B is a view showing an image of an output region of light outputted from the PBGF shown in FIG. 6;

DESCRIPTION OF THE PREFERRED EMBODIMENTS

Figure 1:
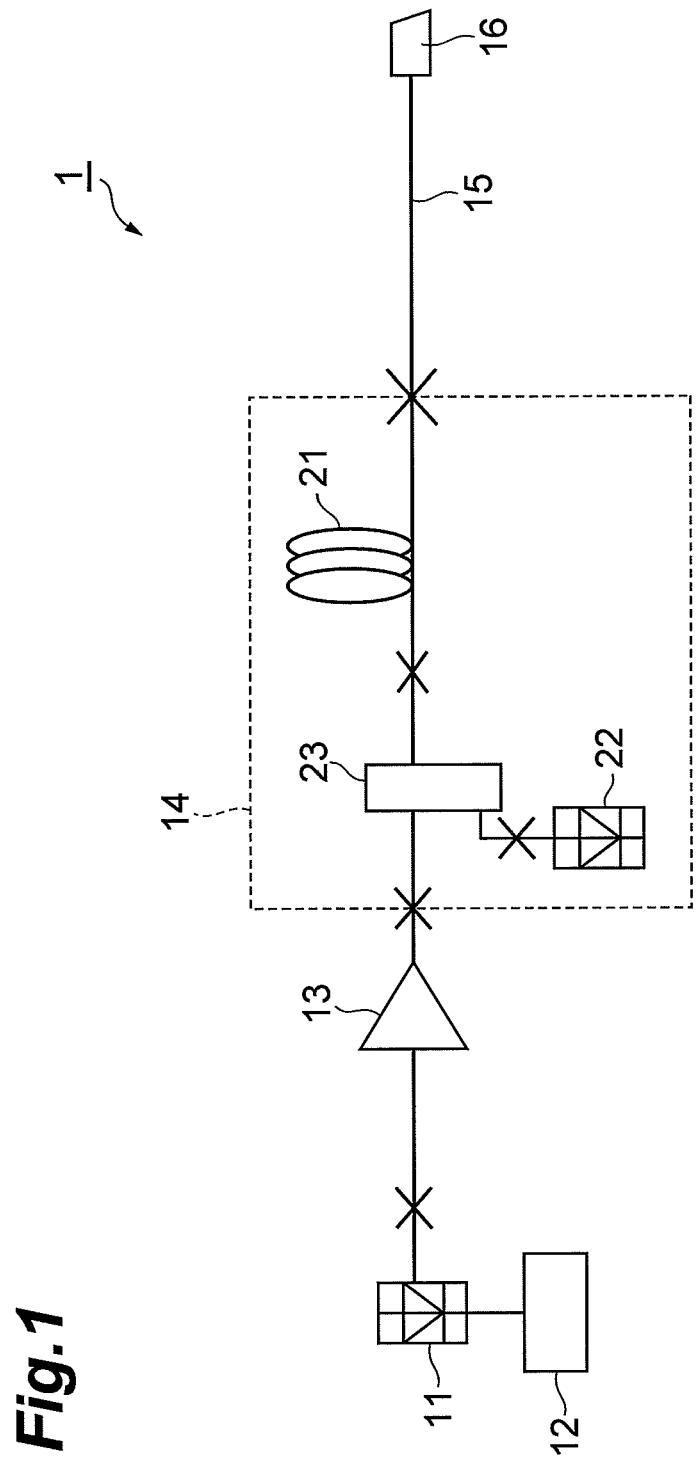
FIG. 1 is a view showing a configuration of a first embodiment of a light source apparatus according to the present invention.

In the following, modes for carrying out the present invention are described in detail with reference to the accompanying drawings. In the description of the drawings, components identical to each other are denoted with the same reference numerals, and overlapping description is omitted.

(First Embodiment)

FIG. 1 is a view showing a configuration of a first embodiment of a light source apparatus according to the present invention. A light source apparatus 1 has an MOPA configuration, and comprises a seed light source 11, a pulse generator 12, an intermediate optical amplifier 13, a final stage optical amplifier 14, a delivery optical fiber 15, and a light output terminal 16. The seed light source 11 includes a semiconductor laser, is directly modulated by a pulse signal outputted from the pulse generator 12, and outputs pulsed light. The intermediate optical amplifier 13 inputs pulsed light outputted from the seed light source 10 as seed light, and amplifies the seed light. The final stage optical amplifier 14 further amplifies the pulsed light outputted from the intermediate optical amplifier 13. The delivery optical fiber 15 makes the pulsed light outputted from the final stage optical amplifier 14 propagate from the input terminal to the output terminal 16, and then the propagated pulsed light is outputted to the outside of the delivery optical fiber 15 through the output terminal 16. The light source unit includes optical elements from the seed light source 11 to an amplifying optical fiber 21, and outputs main output light in single-mode from the optical amplifying fiber. The light source unit may not be a MOPA type using a seed light source shown in FIG. 1, and may be a solid-state laser or a Q-switch type.

The final stage optical amplifier 14 includes an amplifying optical fiber 21, a pumping light source 22, and an optical coupler 23. The amplifying optical fiber 21 is an optical fiber whose core is doped with rare earth elements (for example, Yb, Er, Nd, Tm, Ho, Tb, and the like) serving as an active substance. The amplifying optical fiber 21 is pumped by pumping light inputted from the pumping light source 22 through the optical coupler 23 and amplifies light to be amplified from the intermediate optical amplifier 13 after passing through the optical coupler 23.

The amplifying optical fiber 21 is preferably a double-cladding optical fiber having a core, a first cladding and a second cladding. The refractive index of the core is higher than that of the first cladding, and the refractive index of the first cladding is higher than that of the second cladding. In this case, the light to be amplified is guided inside the core, and the pumping light is guided inside both of the core and the first cladding. The pumping light source 22 outputs pumping light with a wavelength capable of pumping rare earth elements doped in the amplifying optical fiber 21. The pumping light source 22 is preferably a semiconductor laser.

In an optical path between the seed light source 11 and the final stage optical amplifier 14, a plurality of stages of intermediate optical amplifiers 13 may be provided, or the intermediate optical amplifiers 13 may not be provided, a plurality of pumping light sources 22 may be provided, and in this case, as the optical coupler 23, an optical combiner is preferably used. In FIG. 1, a forward-pumping structure is shown, however, a backward-pumping structure may be used or a bidirectional pumping structure may be used. In order to prevent that light returns, an optical isolator may be provided.

Absorption of pumping light in the amplifying optical fiber 21 is determined by the characteristics of the amplifying optical fiber 21, and is changed mainly according to a mode field diameter, a diameter of the first cladding, and a dopant concentration of rare earth elements in the core. For example, in a Yb-doped optical fiber that has a dopant concentration of approximately 10000 ppm, a mode field diameter of approximately 7 µm, a diameter of the first cladding of approximately 130 µm, and a length of 5 m, pumping light of approximately 2.4 dB in the pumping wavelength 915 nm band is absorbed. In the example described above, the 915 nm band (915±20 nm) was applied as an pumping wavelength, however, the 940 nm band (940±5 nm) or a 976 nm band (976±5 nm) may be applied as an pumping wavelength.

Figure 2:
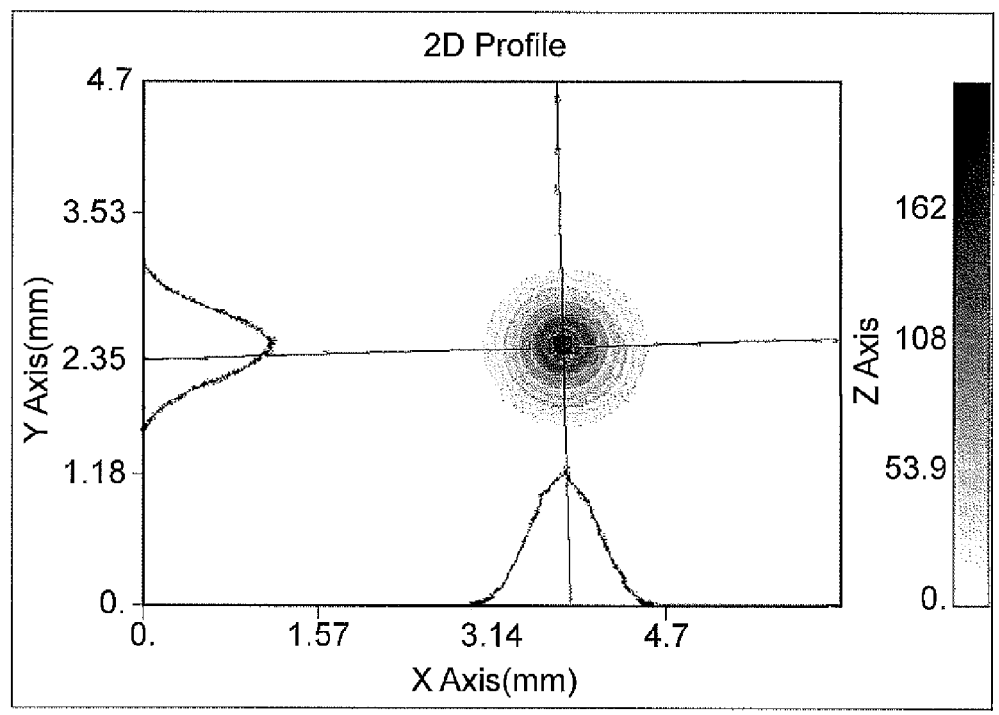
FIG. 2 is a view showing an NFP of output light at a light output terminal of a light source apparatus according to a comparative example using a single-mode optical fiber having a normal configuration as a delivery optical fiber 15.

In the case of a comparative example using a single-mode optical fiber having a normal configuration as the delivery optical fiber 15 (light source apparatus having the structure shown in FIG. 1 without the delivery optical fiber), the near field pattern (NFP) of the output light at the light output terminal 16 is a pattern as shown in FIG. 2. FIG. 2 is a view showing an NFP of output light at the light output terminal 16 in the light source apparatus according to the comparative example using a single-mode optical fiber having a normal configuration as a delivery optical fiber 15. As shown in FIG. 2, in this comparative example, a light intensity distribution of output light at the light output terminal 16 is a Gaussian distribution or close to a Gaussian distribution.

Figure 3:
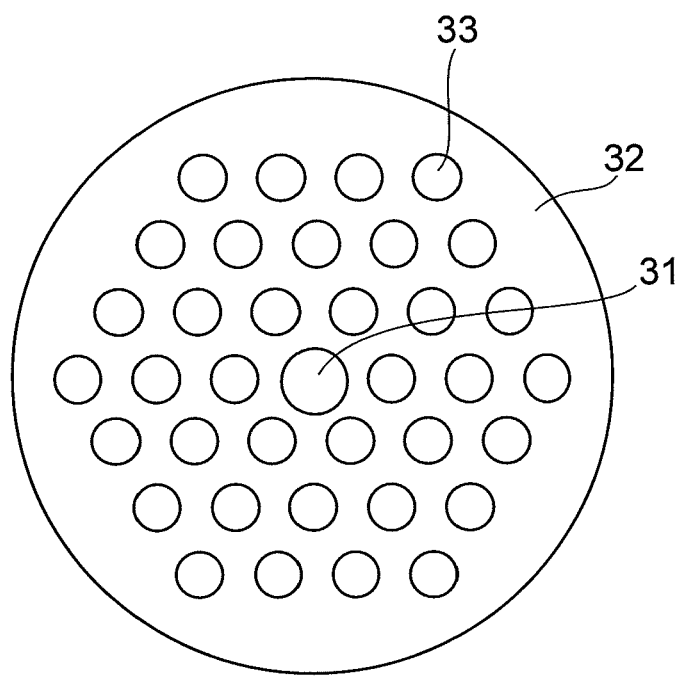
FIG. 3 is a view showing a section of a PBGF.
Figure 4:
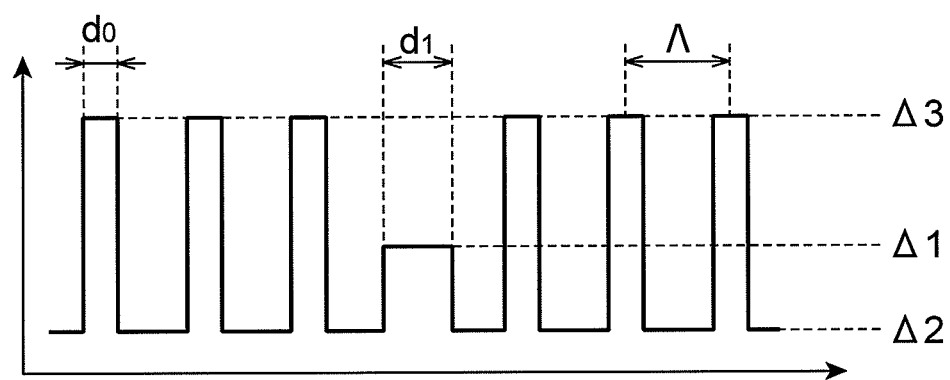
FIG. 4 is a view showing a refractive index profile of the PBGF.

On the other hand, in the light source apparatus according to the present embodiment, a photonic bandgap fiber (PBGF) having a photonic bandgap structure at the core-surrounding portion located around the core is adopted as the delivery optical fiber 15. There are various PBGF configurations, and an example thereof is shown in FIG. 3 and FIG. 4. FIG. 3 is a view showing a section of the PBGF. FIG. 4 is a view showing a refractive index profile of the PBGF.

The PBGF includes, in a section perpendicular to a fiber axis, a core 31, a low refractive index region 32 surrounding the core 31, and a plurality of high refractive index regions 33 two-dimensionally aligned with a fixed period in the low refractive index region 32. The refractive index of the low refractive index region 32 is lower than that of the core 31, and the refractive indexes of the high refractive index regions 33 are higher than that of the core 31. The refractive indexes of the respective regions, the diameter d0 of the core 31, the diameters d1 of the high refractive index regions 33, and the period $\Lambda$ of arrangement of the high refractive index regions 33, etc., determine the characteristics of the PBGF, and a wavelength separation function and a filter function for core propagating light are given to the PBGF.

The wavelength component of the core propagating light, cut by the wavelength separation or filter function, is confined inside the core-surrounding portion located around the core 31 without leaking to the cladding, and propagate to the output terminal of the PBGF. Light that was once coupled to the core-surrounding portion is not re-coupled to the core.

Figure 5:
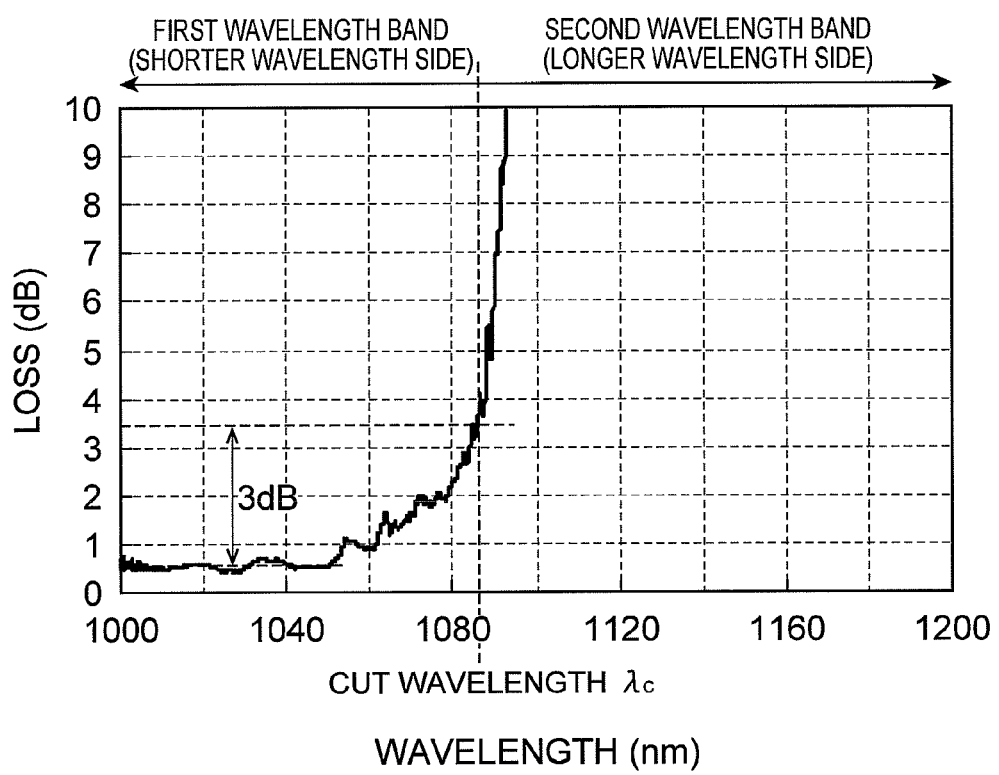
FIG. 5 is a view showing an example of power transfer loss characteristics of the PBGF.

When the relative refractive index difference $\Delta 1$ of the core 31 is 0.19%, the relative refractive index difference $\Delta 2$ of the low refractive index region 32 is 0.04%, and the relative refractive index differences $\Delta 3$ of the high refractive index regions 33 are 1.00%, the diameter d0 of the core 31 is 10 the µm, the diameters d1 of the high refractive index regions 33 are 8.4 µm, and the period $\Lambda$ of arrangement of the high refractive index regions 33 is 14 µm, power transfer loss characteristics of the PBGF in this case are as shown in FIG. 5. In the power transfer loss characteristics of the PBGF shown in FIG. 5, the loss is small on the shorter wavelength side (first wavelength band) than the cut wavelength $\lambda_C$, and the loss is great on the longer wavelength side (second wavelength band) than the cut wavelength $\lambda_C$.

As power transfer loss characteristics according to propagation region movement within a fiber section of the PBGF, one side (shorter wavelength side) of the cut wavelength $\lambda_C$ is a low loss band with a substantially constant low loss, and the other side (longer wavelength side) of the cut wavelength $\lambda_C$ is a high loss band with a high loss. The cut wavelength $\lambda_C$, that indicates a boundary wavelength between the low loss band and the high loss band, is defined as a wavelength that takes a loss 3 dB more than a loss that takes a substantially constant value in the low loss band of the used fiber.

The power transfer loss characteristics of the PBGF change according to the fiber length, the bending diameter, and the number of windings, etc. In the characteristics example shown in FIG. 5, at a wavelength around 1030 to 1060 nm, the loss of core propagating light is low and is approximately 0.5 dB. However, from around 1080 nm, the loss increases. This is not a background loss of the fiber itself, but is caused by movement of the power of the core propagating light to the core-surrounding portion. The characteristics shown in FIG. 5 indicate that in the PBGF given with a filter function, propagating light on the longer wavelength side than the cut wavelength $\lambda_C$ as the filter function propagates to the output terminal.

When a PBGF having the power transfer loss characteristics shown in FIG. 5 is used and laser light with a wavelength of 1100 nm is inputted into this PBGF, light of approximately 20 dB propagates in the core-surrounding portion of the PBGF. By further increasing the cut ratio, light to propagate in the core-surrounding portion can be further increased. By this effect, at the output terminal of the PBGF, the light hardly propagates in the core propagating portion, and intensive laser light propagates in the core-surrounding portion, and a ring-shaped light intensity distribution can be obtained at the output terminal.

Figure 6:
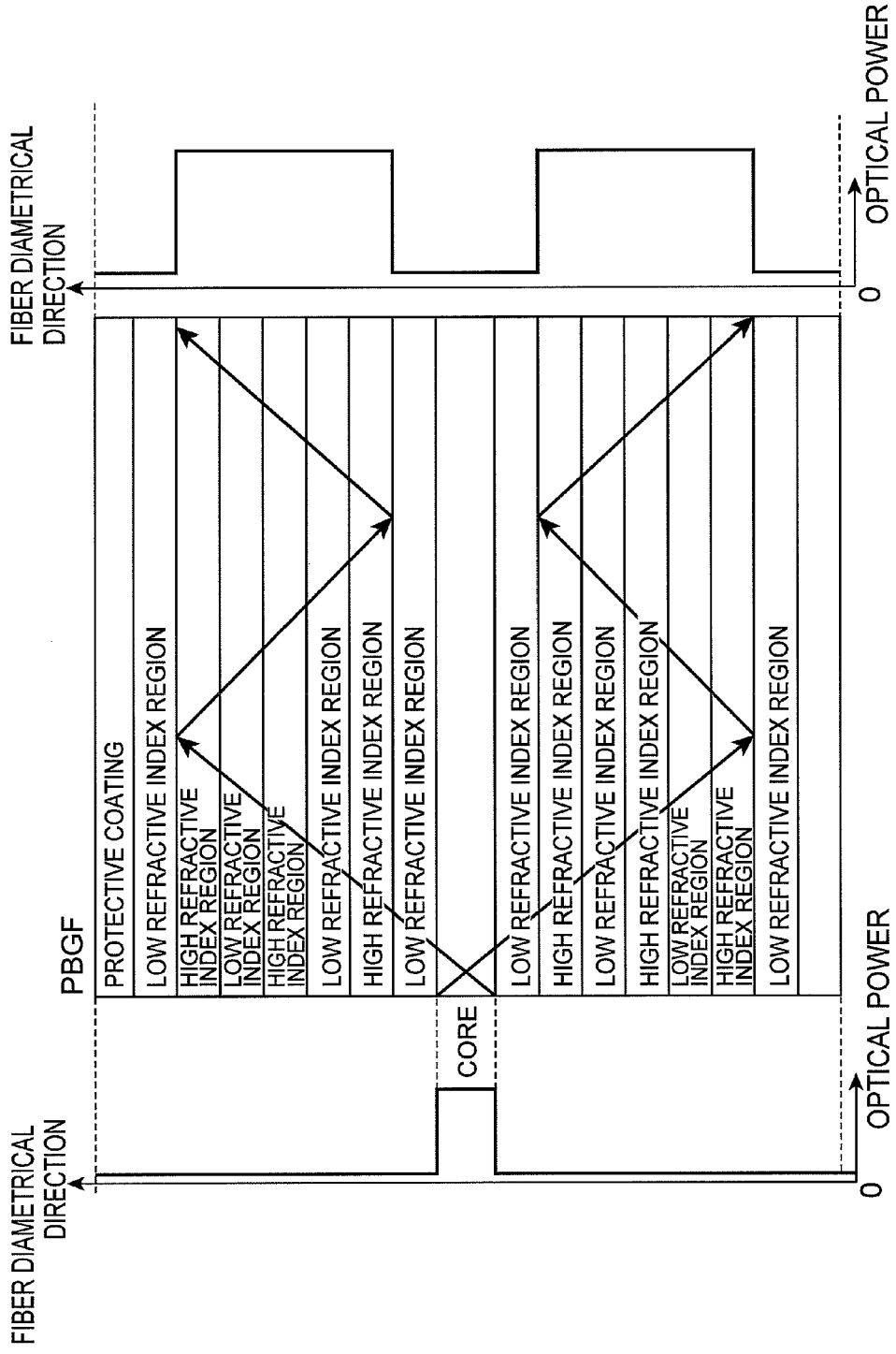
FIG. 6 is a view showing an image of light propagation in the PBGF when light with a wavelength shorter than the cut wavelength is inputted into the PBGF.

FIG. 6 is a view showing an image of light propagation in the PBGF when light with a wavelength shorter than the cut wavelength is inputted into the PBGF. FIG. 7A is a view showing an image of an input region of light inputted into the PBGF shown in FIG. 6, and FIG. 7B is a view showing an image of an output region of light outputted from the PBGF shown in FIG. 6. Light (FIG. 7A) inputted in single-mode into the core region shown in FIG. 6 cannot remain input light with a wavelength longer than the cut wavelength in the core portion and is guided to the high refractive index region due to the bandgap structure of the PBGF. Therefore, input light propagating in the high refractive index region is reflected by the interface with the low refractive index region adjacent to the outer side of the high refractive index region. On the other hand, the high refractive index region has a refractive index higher than that of the core region adjacent to the inner side of the high refractive index region, so that the input light propagating in the high refractive index region is also reflected by the interface with the core. As a result, light guided in the core portion transfers to the high refractive index region, and its section becomes ring-shaped as shown in FIG. 7B.

In the description given above, the ring-shaped light intensity distribution is described, however, it is unlikely that the power of the light propagating in the PBGF becomes completely zero at the core center portion, so that power at the core center portion and power at the core-surrounding portion are compared with each other, and when the power at the core-surrounding portion is twice or more as high as the power at the core center portion, the light intensity distribution is defined as ring-shaped. The propagation area of light propagating in the core-surrounding portion is wide in a sectional view, so that the above-described value of twice or more is a value as a result of comparison of the propagation power at the core center portion and the cumulative total propagation power at the core-surrounding portion.

Figure 8:
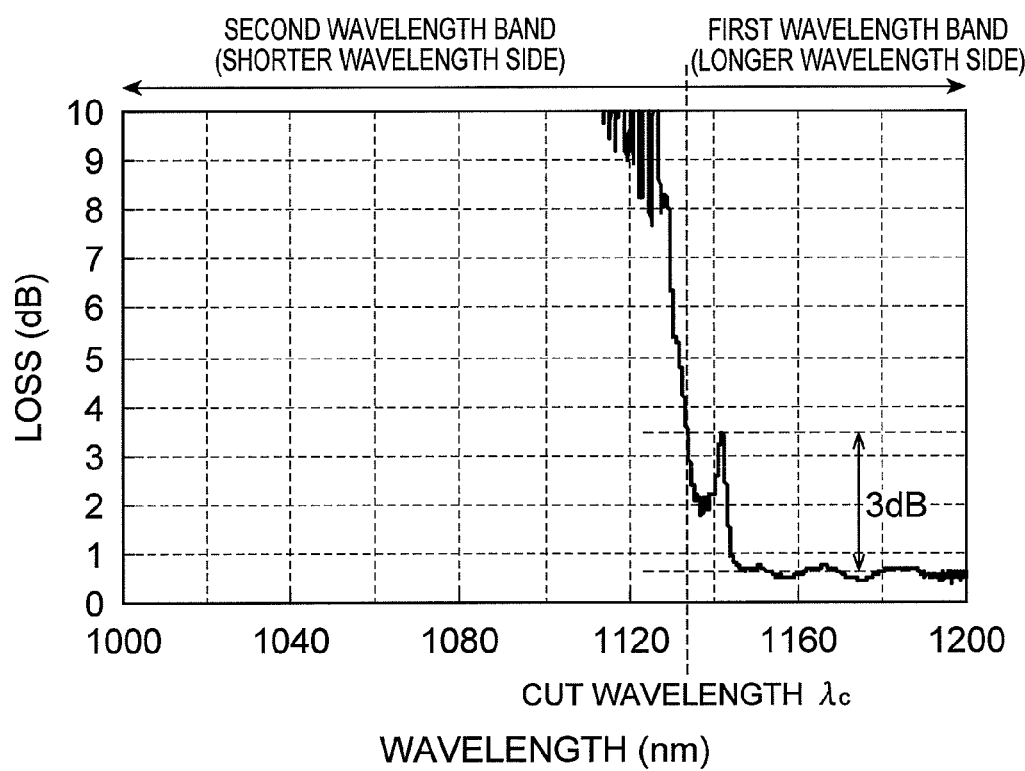
FIG. 8 is a view showing another example of power transfer loss characteristics of the PBGF.

In the power transfer loss characteristics of the PBGF shown in FIG. 5, the shorter wavelength side than the cut wavelength $\lambda_C$ is a low loss band with a substantially constant low loss, and the longer wavelength side than the cut wavelength $\lambda_C$ is a high loss band with a high loss, and the wavelength of light to be outputted from the seed light source 11 exists on the longer wavelength side than the cut wavelength $\lambda_C$. On the other hand, the power transfer loss characteristics of the PBGF shown in FIG. 8 are also possible. Specifically, in the power transfer loss characteristics shown in FIG. 8, the longer wavelength side (first wavelength band) than the cut wavelength $\lambda_C$ is a low loss band with a substantially constant low loss, and the shorter wavelength side (second wavelength band) than the cut wavelength is a high loss band with a high loss, and in this case, the wavelength of light to be outputted from the seed light source 11 exists on the shorter wavelength side than the cut wavelength $\lambda_C$. A PBGF with such power transfer loss characteristics can be realized by changing a bending state. However, as an example, in a PBGF having a cross section shown in FIG. 3 and a refractive index profile shown in FIG. 4, when the relative refractive index difference $\Delta 1$ of the core 31 is 1.00%, the relative refractive index difference $\Delta 2$ of the low refractive index region 32 is −0.36%, and the relative refractive index differences $\Delta 3$ of the high refractive index regions 33 are 3.00%, the diameter d0 of the core 31 is 2.3 µm, the diameters d1 of the high refractive index regions 33 are 5.4 µm, and the period A of arrangement of the high refractive index regions 33 is 9.0 µm, power transfer loss characteristics of the PBGF in this case are as shown in FIG. 8.

Organizing the relationship among the cut wavelength $\lambda_C$ of the PBGF, a power transfer loss $L_{short}$ on the shorter wavelength side than the cut wavelength $\lambda_C$ of the PBGF, a power transfer loss $L_{long}$ on the longer wavelength side than the cut wavelength $\lambda_C$ of the PBGF, and the wavelength $\lambda 1$ of light to be outputted from the seed light source 11, $\lambda_C < \lambda 1$ when $L_{short} < L_{long}$, and $\lambda 1 < \lambda_C$ when $L_{short} > L_{long}$.

The case where the cut wavelength of the PBGF is 1080 nm and light with a wavelength of 1100 nm in the high loss band is inputted into the PBGF is described above. However, even when the wavelength of the light to be inputted into the PBGF is shorter than 1100 nm, the same effect may be obtained. Next, a description is given about obtaining output light with a ring-shaped light intensity distribution when the wavelength of light to be inputted into the PBGF is shorter than the cut wavelength $\lambda_C$.

Figure 9:
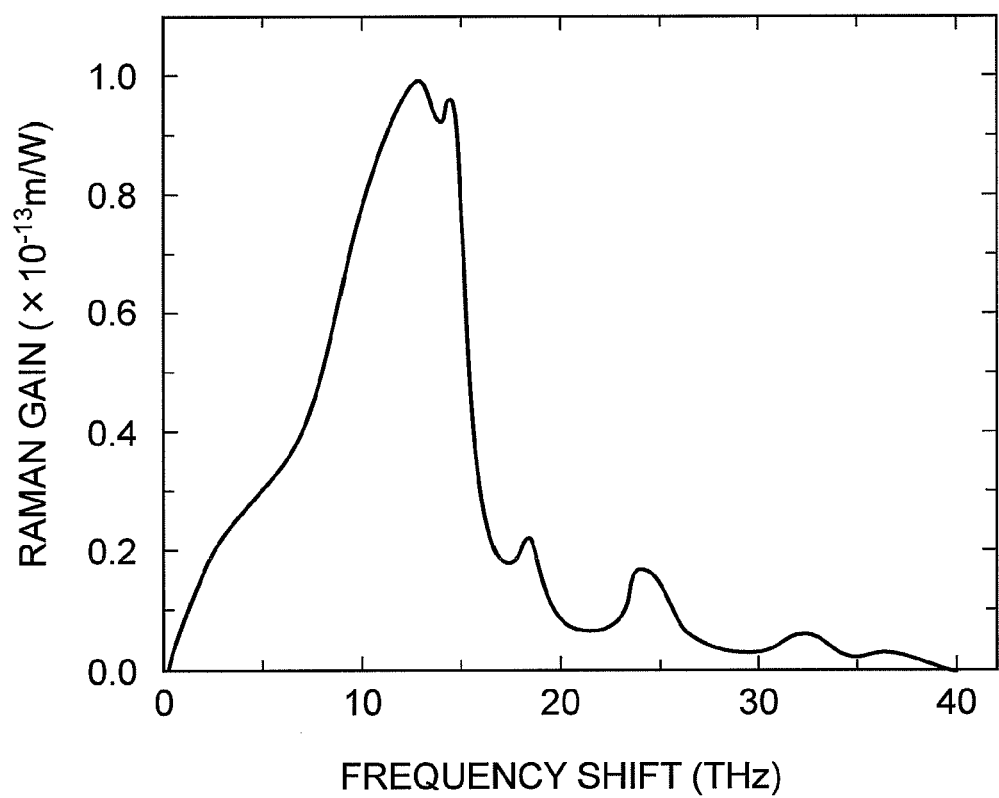
FIG. 9 is a graph showing a relationship between a frequency shift amount and a Raman gain due to SRS.

When high-power light is inputted into an optical fiber, stimulated Raman scattering (SRS) as a nonlinear optical phenomenon occurs in the optical fiber, and first-order Raman scattered light whose peak is at a wavelength shifted to the longer wavelength side by approximately 13 THz from the input light wavelength is generated. FIG. 9 is a graph showing a relationship between a frequency shift amount according to SRS and a Raman gain. The Raman shift amount depends on the material to be propagated. Here, an example using fused silica is shown.

As the input optical power increases, and as the Raman threshold becomes lower, a high-order Raman component more easily appears. Hereinafter, a description is given by applying a limitation that only first-order Raman component appears. When light with a wavelength around 1060 nm is inputted into an optical fiber made of silica glass, a peak wavelength of a first-order Raman component is around 1110 nm.

Therefore, even when the input light wavelength $\lambda 1$ is shorter than the cut wavelength $\lambda_C$ of the PBGF, the wavelength $\lambda_R$ of the first-order Raman component (or high-order Raman component) becomes longer than the cut wavelength $\lambda_C$, and the power of the Raman scattered light shifts to the core-surrounding portion by the PBGF. Specifically, the power of the core propagating light is small, and the power of light propagating in the core-surrounding portion is strong. When the nonlinear optical phenomenon is thus to occur, even when the input light wavelength $\lambda 1$ is shorter than the cut wavelength $\lambda_C$ of the PBGF, output light with a ring-shaped light intensity distribution can be obtained.

The relationship among the cut wavelength $\lambda_C$ of the PBGF, the power transfer loss $L_{short}$ on the shorter wavelength side than the cut wavelength $\lambda_C$ of the PBGF, the power transfer loss $L_{long}$ on the longer wavelength side than the cut wavelength $\lambda_C$ of the PBGF, the wavelength $\lambda 1$ of light to be outputted from the seed light source 11, and the wavelength $\lambda_R$ of Raman scattered light is organized as follows by also taking into account the case where Raman scattering occurs in the PBGF. First, $\lambda 1 < \lambda_R$. Expressing the relationship including the cut wavelength $\lambda_C$ of the PBGF, when $L_{short} < L_{long}$, $\lambda 1 < \lambda_C < \lambda_R$ or $\lambda_C < \lambda 1 < \lambda_R$, and when $L_{short} > L_{long}$, $\lambda 1 < \lambda_C < \lambda_R$ or $\lambda 1 < \lambda_R < \lambda_C$. Specifically, both or either of the wavelength $\lambda 1$ and the wavelength $\lambda_R$ exist in the high loss band, and the intensity distribution of light with a wavelength in the high loss band to be outputted from the output terminal of the PBGF becomes ring-shaped.

In the ring-shaped intensity distribution of light to be outputted from the output terminal of the PBGF, a hole diameter at the center portion of this ring corresponds to the core diameter of the PBGF. Therefore, processing such as to obtain a processed shape only the center portion of which is narrow in area can also be realized.

Figure 10:
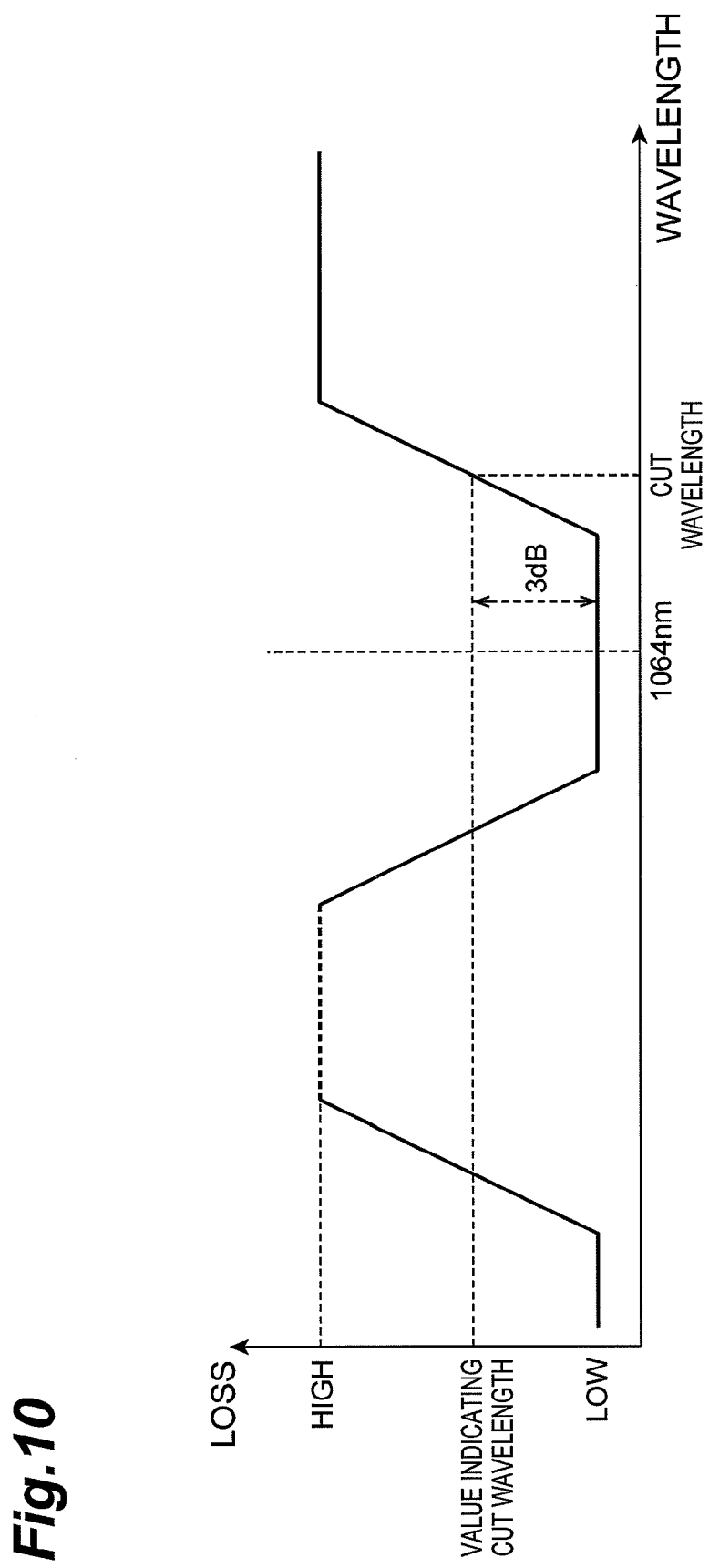
FIG. 10 a view for explaining a relationship between power transfer loss characteristics of the PBGF shown in FIG. 5 and a position of cut wavelength.
Figure 11:
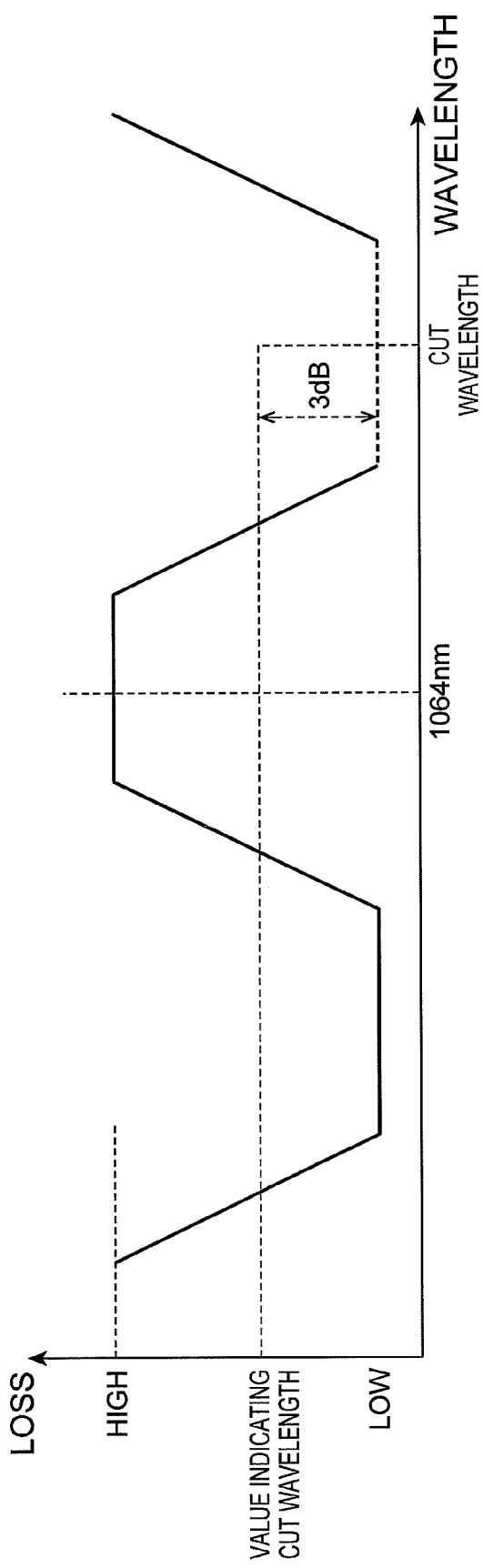
FIG. 11 is a view for explaining a relationship between power transfer loss characteristics of the PBGF shown in FIG. 8 and a position of cut wavelength.

FIGS. 10 and 11 show wavelength characteristics according to a design for PBGF. Specifically, FIG. 10 is a view for explaining a relationship between power transfer loss characteristics of PBGF shown in FIG. 5 and a position of cut wavelength. In FIG. 10, the wavelength characteristics are schematically shown. As a feature of PBGF, low loss bands and high loss bands constitute a periodic structure, and a loss arrangement can be determined with respect to a specific wavelength. As an example of light to be amplified in the present invention, light of 1064 nm band is used. Here, power transfer loss characteristics and a position of cut wavelength will be explained, with respect to the wavelength of 1064 nm.

As shown in FIG. 10, PBGF with the power transfer loss characteristics of FIG. 5 is designed so that a low loss band is arranged at the wavelength of 1064 nm. The light with the wavelength 1064 nm serving as light to be amplified is amplified in an amplification optical fiber, and then its optical power increases. In an amplification process, it is known there is a possibility that Raman phenomenon occurs during light propagation in an optical fiber. Raman phenomenon is a phenomenon to let optical power of input light be energy-shifted to a long wavelength side, and shifted light occurs in the long wavelength side with respect to a Raman pumping wavelength. To the wavelength of 1064 nm that is a wavelength of light to be amplified, a first-order Raman-shifted light occurs near 1110 nm. This indicates a Raman-shift amount of an optical fiber obtained from Ge—Si preform, and such an amount is different from that of an optical fiber obtained from another preform. In order to prevent that light energy-shifted by Raman phenomenon propagates in a core, an optical fiber having the power transfer loss characteristics shown in FIG. 10 is an effective one, and therefore PBGF with a tendency that a loss increases in a long wavelength side with respect to 1064 nm is suitable. In FIG. 10, as a threshold value of wavelength transferring to a high loss band, "cut wavelength" is defined. In the present invention, the wording "cut wavelength" indicates a wavelength that increases by 3 dB from a low loss band. As described above, the point that the low loss bands and the high loss bands constitute a periodic structure was explained. In this case, there is a possibility that a plurality of wavelengths each corresponding "cut wavelength" exist.

On the other hand, FIG. 11 is a view for explaining a relationship between power transfer loss characteristics of PBGF shown in FIG. 8 and a position of cut wavelength, and a high loss band is arranged at 1064 nm by changing a design of PBGF. The case of FIG. 11 also employs a periodic structure, similar to the case of FIG. 10. By changing a design of PBGF, it can be seen that high loss or low loss at a fixed wavelength is determined depending on PBGF. In the case of an example of FIG. 11, the 1064 nm band is arranged in the high loss band, and the cut wavelength in this case indicates a wavelength in a long wavelength side. This is to make a profile of light with the wavelength of 1064 nm be a torus-shaped profile, as beam propagation after PBGF. As described above, Raman phenomenon occurs by the light to be amplified propagating through an optical fiber, but a first-order Raman shift from 1064 nm due to light propagating through a core does not occur because the light with the wavelength of 1064 nm does not propagate through the core. As can be seen from FIG. 11, the cut wavelength is arranged in a long wavelength side with respect to the wavelength of 1064 nm. As described above, in FIG. 11, since the wavelength of 1064 nm is arranged in a high loss band, a wavelength that a loss increases by 3 dB is defined as a cut wavelength, as viewing from a low loss band in the long wavelength side to a short wavelength side.

In addition, in both FIGS. 10 and 11, there is a possibility a misunderstanding such that plural cut wavelengths exist in PBGF with a periodic structure are given even if defining the position of cut wavelength and the 3 dB increase in the design of PBGF. Therefore, "cut wavelength" will be more clearly defined as follows. Namely, in the case that a wavelength $\lambda_B$ that should propagate in a core of PBGF is arranged in low loss band of wavelength characteristics of PBGF, a wavelength, which is a nearest wavelength to $\lambda_B$ with respect to a loss increase slope to a high loss band arranged in a long wavelength side from $\lambda_B$ to a and increases by 3 dB, is defined as "cut wavelength". In addition, in the case that a wavelength $\lambda_B$ that should not propagate in a core of PBGF is arranged in high loss band of wavelength characteristics of PBGF, a wavelength, which is a nearest wavelength to $\lambda_B$ with respect to a loss increase slope from a low loss band arranged in a long wavelength side from $\lambda_B$ to a short wavelength band and increases by 3 dB, is defined as "cut wavelength".

(Second Embodiment)

Figure 12:
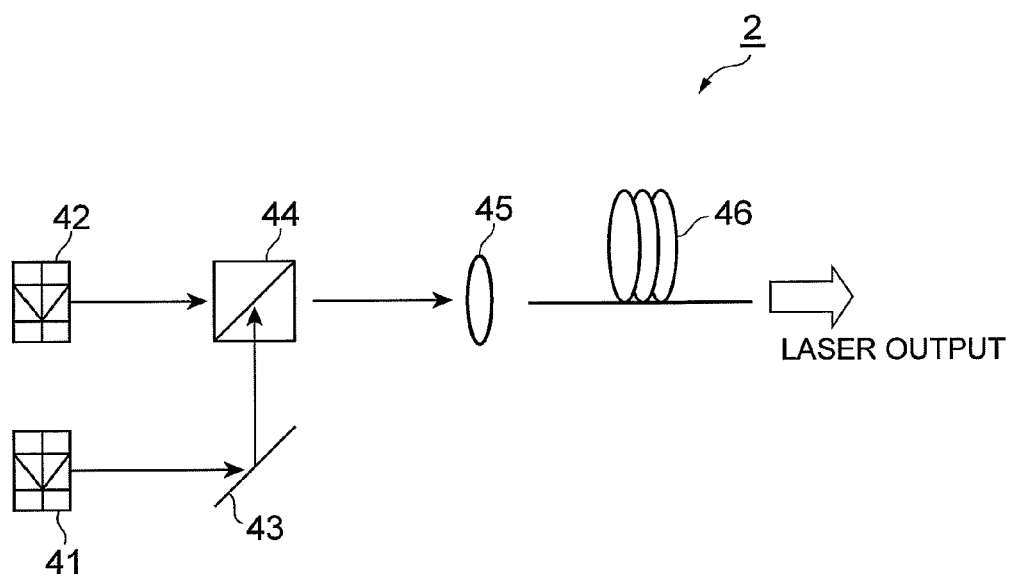
FIG. 12 is a view showing a configuration of a second embodiment of a light source apparatus according to the present invention.
Figure 13:
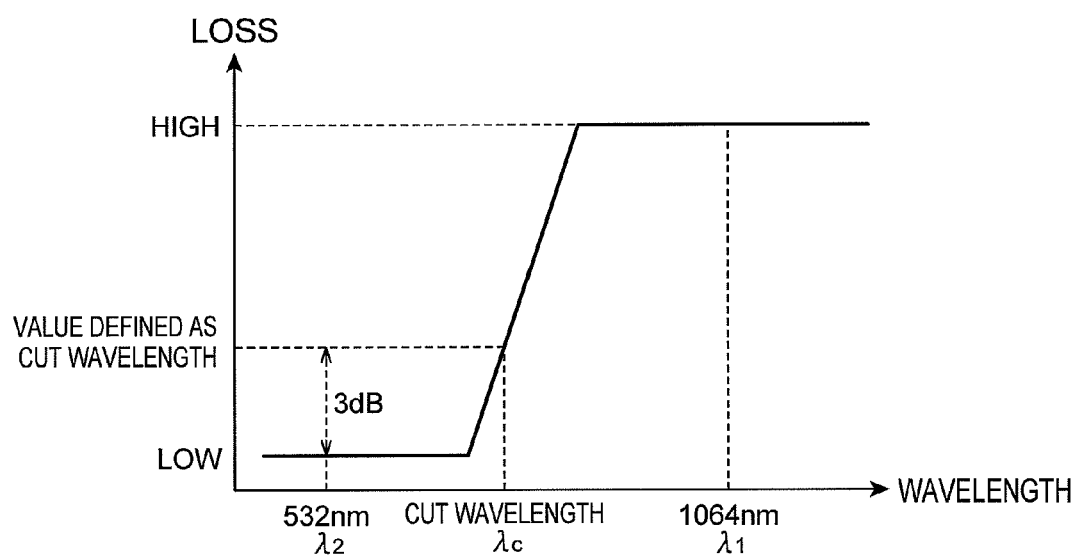
FIG. 13 is a view showing a relationship between wavelengths λ1 and λ2 of lightwaves outputted from light sources in the light source apparatus according to the second embodiment shown in FIG. 12 and a cut wavelength $\lambda_C$ of a delivery optical fiber.

In the above-described first embodiment, a case where a ring-shaped light intensity distribution is obtained is described, however, it is also possible that lightwaves with mutually different wavelengths are distributed in ring shapes in light beam cross sections, respectively, and processing is performed by using these lightwaves with different wavelengths. FIG. 12 is a view showing a configuration of a second embodiment of a light source apparatus according to the present invention. FIG. 13 is a view showing a relationship between the wavelengths $\lambda_1$ and $\lambda_2$ of lightwaves outputted from light sources 41 and 42 of a light source apparatus 2 according to the second embodiment and a cut wavelength $\lambda_C$ of a delivery optical fiber 46. The delivery optical fiber 46 of the light source apparatus 2 is also a PBGF.

In the light source apparatus 2, light with the wavelength $\lambda_1$ (for example, 1064 nm) having a Gaussian intensity distribution outputted from the light source 41 serving as a first light source unit is reflected by a mirror 43, and is then inputted into an optical multiplexer 44. Light with the wavelength $\lambda_2$ (for example, 532 nm) having a Gaussian intensity distribution outputted from the light source 42 serving as a second light source unit is also inputted into the optical multiplexer 44. The light with the wavelength $\lambda_1$ and the light with the wavelength $\lambda_2$ are multiplexed by the optical multiplexer 44, and this multiplexed light passes through a lens 45 and is then inputted into the delivery optical fiber 46 serving as a PBGF through an input terminal. The second light source unit does not assume an existence of the amplifying optical fiber 21 differently from the light source unit of the first embodiment, and therefore an output mode of the second light source unit is not limited to a single-mode.

The wavelength $\lambda_1$ exists in the high loss band of the PBGF, and the wavelength $\lambda_2$ exists in the low loss band of the PBGF.

Specifically, the cut wavelength $\lambda_C$ of the PBGF exists between the wavelength $\lambda_1$ and the wavelength $\lambda_2$. At the output terminal of the PBGF, light with the wavelength $\lambda_2$ is outputted from the core, and light with the wavelength $\lambda_1$ is outputted from the core-surrounding portion.

The light sources 41 and 42 may be optical fiber laser light sources, or may be solid-state laser light sources. When the lightwaves outputted from the light sources 41 and 42 are spatially propagated, the output lightwaves are preferably collimated lightwaves, and when the lightwaves are multiplexed by the optical multiplexer 44, it is preferably multiplexed through a multiplexing element. In the case of fiber delivery, a means that couples the lightwaves while keeping fiber delivery is preferable. By inputting the multiplexed light of the wavelengths $\lambda_1$ and $\lambda_2$ into the PBGF through the lens system 45, the above-described effect can be obtained. In this configuration, different areas can be processed by lightwaves with different beam shapes (and different wavelengths), respectively.

By using the light source apparatus 1 or 2 according to the present embodiment, by irradiating a target to be processed with light with a ring-shaped light intensity distribution outputted from the output terminal of the delivery optical fiber (PBGF) of the light source apparatus, the target to be processed can be processed. At this time, the length or bending state of the delivery optical fiber is preferably set so that the power transfer loss at the wavelength $\lambda_1$ becomes a value 3 dB or more higher than the loss in the low loss band. In addition, the delivery optical fiber is preferably set so that before the bending state of the delivery optical fiber is changed, the intensity distribution of light outputted from the output terminal of the delivery optical fiber is not ring-shaped, and after the bending state of the delivery optical fiber is changed, the intensity distribution of the light outputted from the output terminal of the delivery optical fiber becomes ring-shaped.

In accordance with the present invention, output light with a ring-shaped light intensity distribution whose optical power is higher at the peripheral portion than at the center portion of a light beam cross section can be easily obtained.

What is claimed is:

1. A light source apparatus comprising:
   a first light source unit that outputs single-mode light with a main output wavelength $\lambda_1$;

an amplifier configured to amplify output light from light source; and a delivery optical fiber into which the output light from the first light source unit is inputted, after the output light is amplified, wherein the delivery optical fiber has a photonic bandgap structure in a core-surrounding portion located around a core thereof, the delivery optical fiber having, in the core, a first wavelength band having a first loss value that is substantially constant throughout the first wavelength band and a second wavelength band having a second loss value higher than the first loss value in the first wavelength band, as power transfer loss characteristics according to change in a longitudinal direction of an output light propagating region in a fiber cross section, wherein the wavelength $\lambda 1$ exists in the second wavelength band, and wherein a bending state of the delivery optical fiber is set so that the light with the wavelength $\lambda 1$ outputted from the delivery optical fiber becomes a ring-shaped light intensity distribution in the core-surrounding portion.

2. The light source apparatus according to claim 1, further comprising a second light source unit that outputs light with a main output wavelength $\lambda 2$, wherein the wavelength $\lambda 2$ exists in the first wavelength band, and wherein the light with the wavelength $\lambda 1$ and the light with the wavelength $\lambda 2$ are multiplexed, and the multiplexed light is inputted into the delivery optical fiber.

3. The light source apparatus according to claim 1, wherein at least one of the length and the bending state of the delivery optical fiber is set so that power transfer loss at the wavelength $\lambda 1$ becomes a value 3 dB or more higher than the first loss value.

4. The light source apparatus according to claim 1, wherein the first wavelength band is located on the shorter wavelength side than the second wavelength band.

5. The light source apparatus according to claim 1, wherein the first wavelength band is located on the longer wavelength side than the second wavelength band.

6. A processing method comprising the steps of:

preparing a light source apparatus which comprises:

a first light source unit that outputs single-mode light with a main output wavelength $\lambda 1$;

an amplifier configured to amplify output light from the first light source; and a delivery optical fiber into which the output light from the first light source unit is inputted, after the output light is amplified, wherein the delivery optical fiber has a photonic bandgap structure in a core-surrounding portion located around a core thereof, the delivery optical fiber having, in the core, a first wavelength band having a first loss value that is substantially constant throughout the first wavelength band and a second wavelength band having a second loss value higher than the first loss value in the first wavelength band, as power transfer loss characteristics according to change in a longitudinal direction of an output light propagating region in a fiber cross section, wherein the wavelength $\lambda 1$ exists in the second wavelength band, and wherein a bending state of the delivery optical fiber becomes a ring-shaped light with the wavelength $\lambda 1$ outputted from the delivery optical fiber becomes a ring-shaped light intensity distribution in the core-surrounding portion; and processing a target to be processed by irradiating the target to be processed with light having a ring-shaped light intensity distribution outputted from an output terminal of the delivery optical fiber of the light source apparatus.

7. The processing method according to claim 6, wherein the delivery optical fiber is set so that the intensity distribution of light outputted from the output terminal of the delivery optical fiber is not ring-shaped before the bending state of the delivery optical fiber is changed, but the intensity distribution of the light outputted from the output terminal of the delivery optical fiber becomes ring-shaped after the bending state of the delivery optical fiber is changed.

8. A light source apparatus comprising:

a first light source unit that outputs single-mode light with a main output wavelength $\lambda 1$;

an amplifier configured to amplify output light from the first light source; and a delivery optical fiber into which the output light source from the first light source unit is inputted, after the output light is amplified, the delivery optical fiber generating Raman scattered light with a wavelength $\lambda R$ when the output light with the wavelength $\lambda 1$ propagates therethrough, wherein the delivery optical fiber has a photonic bandgap structure in a core-surrounding portion located around a core thereof, the delivery optical fiber having, in the core, a first wavelength band having a first loss value that is substantially constant throughout the first wavelength band and a second wavelength band having a second loss value higher than the first loss value in the first wavelength band, as power transfer loss characteristics according to change in a longitudinal direction of an output light propagating region in a fiber cross section, wherein the wavelength $\lambda R$ exists in the second wavelength band, and wherein a bending state of the delivery optical fiber is set so that the light with the wavelength $\lambda R$ outputted from the delivery optical fiber becomes a ring-shaped light intensity distribution in the core-surrounding portion.

9. The light source apparatus according to claim 8, wherein at least one of the length and the bending state of the delivery optical fiber is set so that power transfer loss at the main output wavelength $\lambda R$ becomes a value 3 dB or more higher than the first loss value.

10. The light source apparatus according to claim 8, wherein the first wavelength band is located on the shorter wavelength side than the second wavelength band.

11. The light source apparatus according to claim 8, wherein the first wavelength band is located on the longer wavelength side than the second wavelength band.

12. A processing method comprising the steps of:

preparing a light source apparatus which comprises:

a first light source unit that outputs single-mode light with a main output wavelength $\lambda 1$;

an amplifier configured to amplify output light from the first light source; and a delivery optical fiber into which the output light from the first light source unit is inputted, after the output light is amplified, the delivery optical fiber generating Raman scattered light with a wavelength $\lambda R$ when the output light with the wavelength $\lambda 1$ propagates therethrough, wherein the delivery optical fiber has a photonic bandgap structure in a core-surrounding portion located around a core thereof, the delivery optical fiber having, in the core, a first wavelength band having a first loss value that is substantially constant throughout the first wavelength band and a second wavelength band having a second loss value higher than the first loss value in the first wavelength band, as power transfer loss characteristics according to change in a longitudinal direction of an output light propagating region in a fiber cross section, wherein the wavelength $\lambda R$ exists in the second wavelength band, and wherein a bending state of the delivery optical fiber is set so that the light with the wavelength $\lambda R$ outputted from the delivery optical fiber becomes a ring-shaped light intensity distribution in the core-surrounding portion; and processing a target to be processed by irradiating the target to be processed with light having a ring-shaped light intensity distribution outputted from an output terminal of the delivery optical fiber of the light source apparatus.

13. The processing method according to claim 12, wherein the delivery optical fiber is set so that the intensity distribution of light outputted from the output terminal of the delivery optical fiber is not ring-shaped before the bending state of the delivery optical fiber is changed, but the intensity distribution of the light outputted from the output terminal of the delivery optical fiber becomes ring-shaped after the bending state of the delivery optical fiber is changed.

* * * * *